May 9, 1939.  J. W. SMITH  2,157,101
BEARING
Filed May 16, 1936
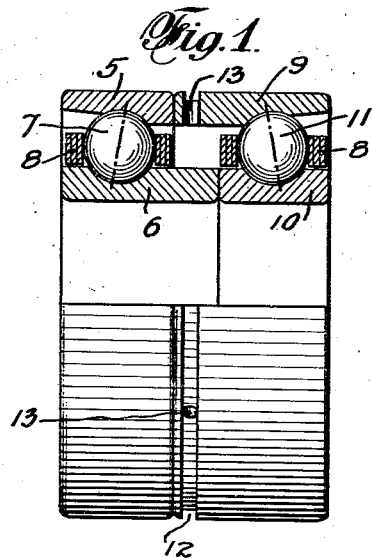
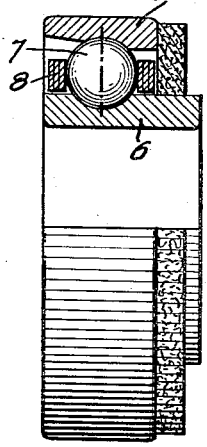
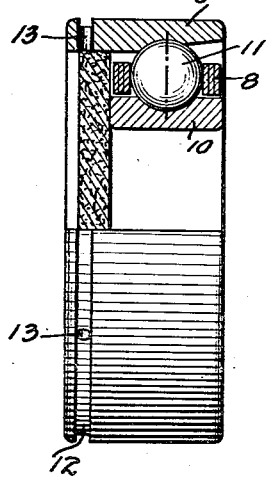
INVENTOR
JOHN W. SMITH
BY
Mitchell Becket
ATTORNEYS.

Patented May 9, 1939

2,157,101

UNITED STATES PATENT OFFICE 2,157,101

BEARING

John W. Smith, New Britain, Conn., assignor to The Fafnir Bearing Company, New Britain, Conn., a corporation of Connecticut Application May 16, 1936, Serial No. 80,082

3 Claims. (Cl. 308—195)

My invention relates to a preloaded bearing of the duplex type.

Anti-friction bearings are now very commonly preloaded when applied to spindles and various other devices so as to secure extreme radial or axial rigidity or both. Anti-friction bearings are usually preloaded by interposing spacers between the outer rings of a pair of bearings and between the inner rings of the bearings and then forcing all of the rings endwise into contact with the spacers. The spacers are of such lengths that the bearings will be stressed or preloaded so as to provide for the increased rigidity, either axially, radially or both, depending upon the particular application. Duplex bearings are now furnished by bearing manufacturers and comprise a pair of anti-friction bearings which are matched or mated with each other and are designed so that when the outer rings of the pair are in end contact with each other and the inner rings are in end contact with each other the bearings will be preloaded. The extent of preload is determined by grinding the edge faces of the bearing rings to cause greater or less stressing of the bearing members when all of the corresponding rings are forced into contact with each other.

During the process of grinding off the faces of either the inner ring or the outer ring for effecting preloading of the bearings, it is obvious that from a practical manufacturing standpoint the bearing must be completely assembled, that is, the two rings must be assembled in relation with the anti-friction bearing members, such as the balls, and in grinding such a completely assembled bearing it is important to prevent the entry of abradant or other foreign matter onto the raceway surfaces or the surfaces of the anti-friction bearing members.

It is an object of my invention, therefore, to provide a duplex type of bearing comprising a pair of bearings, each including inner and outer bearing rings with interposed anti-friction bearing members, the rings of which may be very readily ground so as to preload the bearings to the desired extent and to facilitate the grinding away of stock from the face of one or both of the rings of a bearing without danger of the entry of abradant or other foreign matter into the bearing.

Another object is to provide a duplex type bearing in which proper mounting is greatly facilitated.

Another object is to provide a generally improved form of duplex bearing.

Other objects will be hereinafter pointed out or will become apparent to those skilled in the art.

In the drawing which shows, for illustrative purposes only, a preferred form of the invention—

Fig. 1 is a side view in quarter section of a duplex bearing, illustrating features of the invention;

Fig. 2 is a view in quarter section of the left-hand bearing of Fig. 1, showing means to protect the bearing against the entry of abradant or foreign matter while the inner ring is exposed for grinding; and Fig. 3 is a similar view of the right-hand bearing of Fig. 1, showing the bearing protected and the outer ring exposed for grinding.

While various types of bearings may be employed I have disclosed bearings of the so-called "radial thrust" type. The dot-dash lines of Fig. 1 indicate generally the lines of angular contact when the duplex bearing is completely mounted.

The left-hand bearing comprises an outer bearing ring 5 and an inner bearing ring 6, both rings having raceway surfaces for anti-friction bearing members, such as balls 7. If the bearing is not completely filled with balls the balls may be retained and spaced, as by means of a retainer 8.

The right-hand bearing comprises an outer ring 9 corresponding to the ring 5, an inner ring 10 corresponding to the ring 6, and anti-friction bearing members 11 corresponding to those of the other bearing.

When the duplex bearing comprising the two anti-friction bearings is completely assembled, for example, on a spindle and in a housing, the inner rings 6—10 are forced into end contact with each other and the outer rings 5—9 are likewise forced into end contact with each other and when the rings are in such contact the gearing will be preloaded, depending upon the length of the bearing rings. Thus, by grinding off more of the abutting end face of one of the inner rings and then forcing the rings 6—10 into end contact with each other the preload will be increased, as will be understood.

My invention relates particularly to the construction of the bearings, in that the outer ring of one bearing is relatively much longer than the other outer ring and the inner ring of one bearing is relatively much longer than the other inner ring. As illustrated, the outer ring 9 is much longer than the other outer ring 5 and much longer than the complementary inner ring 10, so that, as shown particularly in Fig. 3, one end of the outer ring 9 projects out a very substantial distance beyond the corresponding end face of the inner ring 10. Correspondingly, the inner ring 6 is much longer than and projects out a very substantial distance beyond the corresponding end face of its outer ring 5.

The exact proportioning or forming of the rings of the proper relative lengths is greatly facilitated by providing the projecting inner and outer rings, as shown. For example, when it is desired to preload or increase the preloading of the duplex bearing, one of the inner rings must be shortened and this shortening is usually done by grinding. If the inner and outer rings, such as the rings 5 and 6, are of the same length such grinding of one of the rings without grinding the other is in some cases a difficult matter. However, with, say, the ring 6 projecting substantially beyond the corresponding end of the ring 5, the right-hand end of the ring 6 may be very readily ground on a surface grinder. Furthermore, by having the ring 6 projecting very substantially beyond the end of the ring 5 it will be seen that a shield, such as a felt washer, may be slipped over the projecting end of the ring 5 and fit quite tightly thereon and extend outwardly so as to mask the space between the two rings and be forced into engagement with the corresponding face of the outer ring 5, all while leaving the extreme right-hand end of the ring 6 exposed for grinding. When approximately a sufficient amount of stock has been removed from the end of the ring 6, the felt washer may be stripped off and the operator is assured that no abradant has accidentally gotten onto the bearing surfaces or balls during grinding. The two bearings may then be forced together and tested to determine whether or not the desired extent of preload has been obtained. On the other hand, if two much stock is taken from the inner ring 6 and the desired preload has been exceeded, stock may be taken from the outer ring and the preload thus reduced. If the outer ring is to be ground it will be seen that it is highly advantageous to have the end projecting substantially beyond the corresponding end of the inner ring. My construction provides an opportunity for forcing a shield, such as a felt disk or plug, into the bore of the outer ring to completely mask the space between the rings as well as the bore of the inner ring. Stock may then be ground from the projecting end of the outer ring 9 and by taking the proper amount of stock from either or both rings the desired preload may be very accurately attained.

It will be noted that the angular contact bearings disclosed have been mounted in so called "back to back" relationship with each other, and if both the outer rings and the inner rings are rigidly held to their mountings, substantially equal end thrusts will be taken in both directions. However, duplex bearings may be mounted not only in so called "back to back" relationship as disclosed in Fig. 1 but may also be mounted in so called "face to face" relationship, that is, reversed end for end from the positions shown. The bearings may also be arranged in so called "tandem" relationship when excessive end thrust is to be taken in one direction.

My invention is applicable to bearings regardless of how they are arranged and in fact the invention is of advantage whether or not the rings are mounted in direct contact with each other, that is to say, the bearings may be mounted with spacers between the inner and outer rings and if the spacer between the inner rings be of the same length as the spacer between the outer rings, the preload of the bearings as determined by the bearing manufacturer will be maintained just as effectively as if the bearing rings themselves were mounted in end to end engagement with each other. For other assembly relationships projecting ring portions would be formed at the proper ends so as to properly cooperate with the coacting ring end. Proper end for end assembly is indicated by the relative ring lengths and danger of improper assembly on the job is reduced to a minimum.

I have provided means for effectively lubricating the anti-friction bearing members and raceways when the duplex bearing is completely assembled. Such means includes an opening in one of the rings to conduct lubricant to the space between the rows of balls in the two bearings. As illustrated, one of the rings, preferably the long outer ring 9, is provided with a circumferentially extending groove 12 in the outer surface thereof and one or more radial holes or openings 13 extend from the bottom of the groove into the space between all of the rings and the two rows of balls. When the bearing is assembled in a housing the oil cup or other type of lubricant fitting is made to communicate through a suitable hole or channel in the housing with the groove 12 and lubricant may readily be introduced through the channel 12 and the one or more openings 13. By the means disclosed both rows of balls and their respective races may be effectively lubricated. My general means for lubricating the two rows is quite important, in that both rows of balls are sure of substantially equal lubrication. Such would not be the case if the lubricant were introduced, as is common, at the outer side of one of the rows of balls and this is particularly true when the bearings rotate continuously, for the reason that, in a rotating bearing, particularly at high speed, the balls form quite an effective barrier against the passage of lubricant and one of the rows of balls might be effectively lubricated while the other might run dry. With my construction when one of the bearings is provided directly with a lubricant passage there is small likelihood of defective lubrication.

While the invention has been described in considerable detail and a preferred form as embodied in ball bearings has been illustrated, it is to be understood that various changes and modifications may be made within the scope of the invention as defined in the appended claims.

I claim:

1. In a duplex bearing, a pair of anti-friction bearings, each comprising an outer bearing ring, an inner bearing ring and interposed anti-friction bearing members, said outer rings of said two bearings being in end contact with each other, said inner bearing rings of said two bearings being in end contact with each other and said bearings being proportioned so as to be preloaded when said rings are in end contact with each other as aforesaid, the outer bearing ring of one of said anti-friction bearings projecting substantially beyond its inner bearing ring at the end facing said other bearing.

2. In a duplex bearing, a pair of anti-friction bearings, each comprising inner and outer bearing rings with interposed anti-friction bearing members, said bearings being adapted for end to end mounting with complementary inner rings in end contact with each other and complementary outer rings in end contact with each other, the inner ring of one of said bearings being substantially longer than its outer bearing ring at the end facing the other of said bearings.

3. A duplex bearing, comprising a pair of angular contact bearings, each comprising inner and outer bearing rings with interposed anti-friction bearing members, said outer rings being in end contact with each other and said inner rings being in end contact with each other, the outer ring of one of said bearings being substantially longer than its inner ring at the end facing said other bearing and the outer ring of said other bearing being substantially shorter than its inner ring at the end facing said first mentioned bearing.

JOHN W. SMITH.